US006840963B2

(12) United States Patent
Severns et al.

(10) Patent No.: US 6,840,963 B2
(45) Date of Patent: Jan. 11, 2005

(54) HOME LAUNDRY METHOD

(75) Inventors: John Cort Severns, West Chester, OH (US); Frederick Anthony Hartman, Cincinnati, OH (US); Christiaan Arthur Jacques Kamiel Thoen, West Chester, OH (US); Paul Amaat France, West Chester, OH (US); Phillip Kyle Vinson, Fairfield, OH (US)

(73) Assignee: Procter & Gamble, Cincinnati, OH (US)

( * ) Notice: Subject to any disclaimer, the term of this patent is extended or adjusted under 35 U.S.C. 154(b) by 165 days.

(21) Appl. No.: 09/849,839

(22) Filed: May 4, 2001

(65) Prior Publication Data

US 2001/0054202 A1 Dec. 27, 2001

Related U.S. Application Data

(60) Provisional application No. 60/209,444, filed on Jun. 5, 2000.

(51) Int. Cl.⁷ .............................. D06L 1/00; D06L 1/12; C11D 9/36
(52) U.S. Cl. ................................ 8/137; 8/142; 510/285; 510/466
(58) Field of Search ...................... 8/137, 142; 510/285, 510/466

(56) References Cited

U.S. PATENT DOCUMENTS

| | | | |
|---|---|---|---|
| 3,635,667 A | 1/1972 | Keay et al. | |
| 3,663,160 A | 5/1972 | Stone et al. | |
| 3,854,871 A | 12/1974 | Eanzel et al. | |
| 4,077,770 A | 3/1978 | Rouvellat et al. | |
| 4,097,397 A | 6/1978 | Mizutani et al. | |
| 4,102,824 A | 7/1978 | Mizutani et al. | |
| 4,111,034 A | 9/1978 | Hubner | |
| 4,137,044 A | 1/1979 | Flower et al. | |
| 4,207,072 A | 6/1980 | Schuierer et al. | |
| 4,267,077 A | 5/1981 | Niimi et al. | |
| 4,639,321 A | 1/1987 | Barrat et al. | |
| 4,685,930 A | * 8/1987 | Kasprzak | 8/139.1 |
| 4,708,807 A | 11/1987 | Kemerer | |
| 4,761,896 A | 8/1988 | Miyata | |
| 4,909,962 A | 3/1990 | Clark | |
| 5,037,485 A | 8/1991 | Chromecek et al. | |
| 5,046,337 A | 9/1991 | Ro et al. | |
| 5,057,240 A | * 10/1991 | Madore et al. | 510/328 |
| 5,116,426 A | 5/1992 | Asano et al. | |
| 5,271,775 A | 12/1993 | Asano et al. | |
| 5,302,313 A | 4/1994 | Asano et al. | |
| 5,360,571 A | 11/1994 | Kilgour et al. | |
| 5,443,747 A | 8/1995 | Inada et al. | |
| 5,503,681 A | 4/1996 | Inada et al. | |
| 5,503,778 A | 4/1996 | Liu et al. | |
| 5,520,827 A | 5/1996 | Danner | |
| 5,593,507 A | 1/1997 | Inada et al. | |
| 5,597,792 A | 1/1997 | Klier et al. | |
| 5,628,833 A | 5/1997 | McCormack et al. | |
| 5,676,705 A | 10/1997 | Jureller et al. | |
| 5,683,473 A | 11/1997 | Jureller et al. | |
| 5,683,977 A | 11/1997 | Jureller et al. | |
| 5,690,750 A | 11/1997 | Inada et al. | |
| 5,705,562 A | 1/1998 | Hill | |
| 5,707,613 A | 1/1998 | Hill | |
| 5,716,456 A | 2/1998 | Inada et al. | |
| 5,722,781 A | 3/1998 | Yamaguchi | |
| 5,741,365 A | 4/1998 | Inada et al. | |
| 5,769,962 A | 6/1998 | Inada et al. | |
| 5,783,092 A | 7/1998 | Brown et al. | |
| 5,811,383 A | 9/1998 | Klier et al. | |
| 5,858,022 A | 1/1999 | Romack et al. | |
| 5,865,852 A | 2/1999 | Berndt | |
| 5,866,005 A | 2/1999 | DeSimone et al. | |
| 5,876,510 A | 3/1999 | Kuemin et al. | |
| 5,877,133 A | 3/1999 | Good | |
| 5,888,250 A | 3/1999 | Hayday et al. | |
| 5,929,012 A | 7/1999 | Del Duca et al. | |
| 5,942,007 A | * 8/1999 | Berndt et al. | 8/142 |
| 5,944,996 A | 8/1999 | DeSimone et al. | |
| 5,954,869 A | 9/1999 | Elfersy et al. | |
| 5,977,040 A | 11/1999 | Inada et al. | |
| 5,977,045 A | 11/1999 | Murphy | |
| 5,985,810 A | 11/1999 | Inada et al. | |
| 6,013,683 A | 1/2000 | Hill et al. | |
| 6,042,617 A | 3/2000 | Berndt | |
| 6,042,618 A | 3/2000 | Berndt et al. | |

(List continued on next page.)

FOREIGN PATENT DOCUMENTS

| | | |
|---|---|---|
| CA | 1 239 326 | 7/1988 |
| DE | 2108 991 | 8/1972 |
| DE | 4131589 A1 | 5/1986 |
| DE | 3739711 A | 6/1989 |
| DE | 296 00 628 U1 | 6/1997 |
| DE | 198 10907 A1 | 9/1999 |
| EP | 0 091 261 A2 | 10/1983 |
| EP | 0 118 625 A2 | 9/1984 |
| EP | 0182583 A2 | 5/1986 |
| EP | 0410 068 A1 | 1/1991 |
| EP | 0 422 787 A2 | 4/1991 |

(List continued on next page.)

OTHER PUBLICATIONS

US 6,001,133, 12/1999, DeYoung et al. (withdrawn)
Trilo et al.; "Critical Micelle Density for the Self–Assembly of Block Copolymer Surfactants in Supercritical Carbon Dioxide"; pp. 416–421, Sep. 9, 1999.
Sarbu et al.; "Non–Fluorous Polymers with Very High Solubility in Supercritical $CO_2$ Down to Low Pressures"; pp. 165–168, May 11, 2000.

Primary Examiner—Brian P. Mruk
(74) Attorney, Agent, or Firm—Caroline Wei-Berk; C. Brant Cook; Kim W. Zerby

(57) ABSTRACT

The present invention relates to automatic home laundering processes for cleaning or refreshing fabric articles, especially articles of clothing, linen and drapery. The present invention also relates to automatic home laundering of mixed loads of fabric articles comprising machine washable fabric articles and dry clean only fabric articles.

15 Claims, No Drawings

U.S. PATENT DOCUMENTS

| | | |
|---|---|---|
| 6,056,789 A | 5/2000 | Berndt et al. |
| 6,059,845 A | 5/2000 | Berndt et al. |
| 6,060,546 A | 5/2000 | Powell et al. |
| 6,063,135 A * | 5/2000 | Berndt et al. .................. 8/142 |
| 6,086,635 A | 7/2000 | Berndt et al. |
| 6,114,295 A | 9/2000 | Murphy |
| 6,131,421 A | 10/2000 | Jureller et al. |
| 6,136,766 A | 10/2000 | Inada et al. |
| 6,148,644 A | 11/2000 | Jureller et al. |
| 6,156,074 A | 12/2000 | Hayday et al. |
| 6,177,399 B1 | 1/2001 | Mei et al. |
| 6,200,352 B1 | 3/2001 | Romack et al. |
| 6,200,393 B1 | 3/2001 | Romack et al. |
| 6,200,943 B1 | 3/2001 | Romack et al. |
| 6,204,233 B1 | 3/2001 | Smith et al. |
| 6,228,826 B1 | 5/2001 | DeYoung et al. |
| 6,242,408 B1 | 6/2001 | Elms et al. |
| 6,258,130 B1 | 7/2001 | Murphy |
| 6,273,919 B1 | 8/2001 | Hayday |
| 6,309,425 B1 | 10/2001 | Murphy |
| 6,310,029 B1 * | 10/2001 | Kilgour et al. ............. 510/466 |
| 6,313,079 B1 | 11/2001 | Murphy et al. |
| 6,368,359 B1 | 4/2002 | Perry et al. |
| 2001/0020308 A1 | 9/2001 | Murphy |
| 2001/0034912 A1 | 11/2001 | Kilgour et al. |
| 2001/0054202 A1 * | 12/2001 | Severns et al. ................. 8/142 |
| 2002/0004953 A1 | 1/2002 | Perry et al. |
| 2002/0115582 A1 | 8/2002 | Perry et al. |
| 2002/0174493 A1 | 11/2002 | Perry et al. |

FOREIGN PATENT DOCUMENTS

| | | |
|---|---|---|
| EP | 0 566 240 A1 | 10/1993 |
| EP | 0 679 754 A2 | 11/1995 |
| EP | 0 716 870 A1 | 6/1996 |
| EP | 0 479 146 B1 | 12/1996 |
| EP | 0 767 267 A1 | 4/1997 |
| EP | 0 962519 A1 | 12/1999 |
| EP | 982 023 A2 | 3/2000 |
| EP | 1 041 189 A1 | 10/2000 |
| EP | 1 043 443 A1 | 10/2000 |
| EP | 1 092 803 A1 | 4/2001 |
| FR | 2 268 898 A1 | 11/1975 |
| GB | 1 451 600 A | 10/1976 |
| GB | 1 509 315 | 5/1978 |
| GB | 2 084 204 A | 4/1982 |
| GB | 2 230 022 A | 10/1990 |
| GB | 2 251 867 A | 7/1992 |
| JP | 1098-798 A | 10/1984 |
| JP | 3046-300 A | 8/1986 |
| JP | 3063-799 A | 9/1986 |
| JP | 1188-595 A | 1/1988 |
| JP | 2166-198 A | 12/1988 |
| JP | 2202-599 A | 1/1989 |
| JP | 2222-496 A | 2/1989 |
| JP | 04323299 A | 4/1991 |
| JP | 05051598 A | 8/1991 |
| JP | 002180809 | 1/1992 |
| JP | 05239766 A | 2/1992 |
| JP | 002180808 | 11/1992 |
| JP | 002180810 | 2/1993 |
| JP | 08073837 A | 9/1994 |
| JP | 09143497 A | 11/1995 |
| JP | 002180807 | 12/1996 |
| JP | 10-017891 | 1/1998 |
| JP | 11-092784 | 4/1999 |
| JP | 11-323381 | 11/1999 |
| JP | 11-323383 | 11/1999 |
| JP | 00144175 A | 5/2000 |
| JP | 2000-192085 | 7/2000 |
| JP | 00290689 A | 10/2000 |
| WO | WO 82/02218 A1 | 7/1982 |
| WO | WO 94/01227 A1 | 12/1994 |
| WO | WO 96/30471 A2 | 10/1996 |
| WO | WO 97/35061 A1 | 9/1997 |
| WO | WO 98/07405 A1 | 2/1998 |
| WO | WO 98/16615 A1 | 4/1998 |
| WO | WO 99/57358 | 11/1999 |
| WO | WO 00/04221 | 1/2000 |
| WO | WO 00/04222 | 1/2000 |
| WO | WO 00/63340 | 10/2000 |
| WO | WO 01/06051 A1 | 1/2001 |
| WO | WO 01/34613 A1 | 5/2001 |
| WO | WO 01/34706 A1 | 5/2001 |
| WO | WO 01/40567 A1 | 6/2001 |
| WO | WO 01/94678 A1 | 12/2001 |
| WO | WO 01/94681 A1 | 12/2001 |
| WO | WO 01/94684 A1 | 12/2001 |

* cited by examiner

HOME LAUNDRY METHOD

RELATED APPLICATIONS

This application claims priority under 35 USC §119(e) to U.S. Provisional Application Ser. No. 60/209,444 which was filed on Jun. 5, 2000.

FIELD OF THE INVENTION

The present invention relates to automatic home laundering processes for cleaning or refreshing fabric articles, especially articles of clothing, linen and drapery. The present invention also relates to automatic home laundering of mixed loads of fabric articles comprising machine washable fabric articles and dry clean only fabric articles.

BACKGROUND OF THE INVENTION

For centuries, fabric articles have been washed using water-based processes. In the last century, this home chore was greatly simplified by the development of the automatic washing machine. However, while greatly simplifying the home laundry process, even the home laundry process using the automatic washing machine still requires a significant amount of presorting fabric articles by color and textiles. Typically whites are washed separately from colored fabrics, and brightly colored fabric articles (e.g., dark reds and blues) from less highly colored articles. Further sorting and handling is required when the fabric articles to be laundered include "dry clean only" articles.

More recently, water conservation efforts and environmental concerns have driven laundry machine manufacturers and laundry detergent manufacturers to reduce the amount of water required in the home laundry process. However, such efforts have focused on reducing water consumption by the wash medium rather than changing the wash medium from a primarily water based process.

In parallel, concerns have arisen around the use of "Perc" (short for perchloroethylene) as the wash medium for the commercial dry cleaning process. These concerns have lead to the development of a significant number of proposed alternatives the Perc-based processes, but to date all other alternatives are still not widely used. Examples include hydrocarbons and liquid carbon dioxide. A more recently proposed option as a replacement for Perc in the commercial dry cleaning field involves the use of siloxanes as the cleaning solution for "dry clean only" fabric articles (see, for example, U.S. Pat. No. 5,942,007, Aug. 24, 1999; U.S. Pat. Nos. 6,042,617 and 6,042,618, both Mar. 28, 2000; U.S. Pat. No. 6,056,789, May 2, 2000; U.S. Pat. No. 6,059,845, May 9, 2000; and U.S. Pat. No. 6,063,135, May 16, 2000).

It has been discovered by the present invention that further simplification of the automatic home laundry process and elimination of the reliance on a solely water based home laundry process are possible by using a siloxane based wash medium for the home laundry process. This process allows not only the home cleaning of a consumer's "dry clean only" fabric articles, but also those "machine wash" articles conventionally washed at home in a water wash medium. Further while the consumer may still opt to wash such articles separately, the present invention process allows the consumer the freedom to significantly simplify the home laundry process by washing mixed loads of "dry clean only" and "machine wash" articles, thereby greatly reducing the presorting effort.

SUMMARY OF THE INVENTION

The present invention encompasses an automatic home laundry process comprising the step of cleaning fabric articles in an automatic washing machine in the home with a wash medium comprising siloxane.

The present invention also relates to an automatic home laundry process comprising contacting, in an automatic washing machine, machine washable fabric articles with a wash medium comprising siloxane. More preferred is the siloxane-containing wash medium comprising less than about 50% water, but in some preferred executions it is desired to include some amount of purposively added water preferably in the range of from about 0.1% to about 50% water by weight of the wash medium.

Further preferred processes of the present invention are directed to an automatic home laundry process comprising contacting, in an automatic washing machine, a mixed load of fabric articles comprising machine washable and dry clean only fabric articles with a wash medium comprising siloxane.

These and other aspects, features and advantages will become apparent from the following detailed description and the appended claims. All percentages, ratios and proportions are by weight, and all temperatures are in degrees Celsius (° C.), unless otherwise specified. All measurements are in SI units unless otherwise specified, and all documents cited are in relevant part incorporated herein by reference in their entirety.

DETAILED DESCRIPTION OF THE INVENTION

The term "fabric article", as used herein, means any article that is customarily cleaned in a conventional laundry process or in a dry cleaning process. The term encompasses articles of clothing, linen and drapery, clothing accessories, and floor coverings. The term also encompasses other items made in whole or in part of fabric, such as tote bags, furniture covers, tarpaulins and the like.

The term "machine washable fabric articles", as used herein, means those fabric articles readily identified by die fabric industry and consumers as safe for laundering by a conventional aqueous automatic home laundry process. Consumers are frequently helped in this identification of fabric articles by manufacturer's tags identifying the fabric ankle as "machine washable" or some similar description.

The term "dry clean only fabric articles", as used herein, means those fabric articles readily identified by the fabric industry and consumers as unsafe for laundering by a conventional aqueous automatic home laundry process, and instead requiring special handling with a conventional non-aqueous solvent such as Perc. Again, consumers are frequently helped in this identification of fabric articles by manufacturer's tags identifying the fabric article as "dry clean only" or some. similar description.

The term "automatic home laundry process", as used herein, means the laundry process as practiced by the consumer using an automatic washing machine, preferably located within the consumer's residence (herein referred to as the process being conducted "in the home"), but also including public laundromats whereby the consumer follows essentially the same laundry process as though the automatic washing machine were present in the home.

The term "wash medium", as used herein, means the liquid [including but not limited to, fluid(s) and/or solution (s) and/or solvent(s) and/or emulsion(s)] which is used to wet the fabric articles in the wash load during the automatic home laundry process.

The phrase "dry weight of a fabric article" as used herein means the weight of a fabric article that has no intentionally added fluid weight.

The phrase "absorption capacity of a fabric article" as used herein means the maximum quantity of fluid that can be taken in and retained by a fabric article in its pores and interstices. Absorption capacity of a fabric article is measured in accordance with the following Test Protocol for Measuring Absorption Capacity of a Fabric Article.

Test Protocol for Measuring the Absorption Capacity of a Fabric Article

Step 1: Rinse and dry a reservoir or other container into which a siloxane will be added. The reservoir is cleaned to free it from all extraneous matter, particularly soaps, detergents and wetting agents.

Step 2: Weigh a "dry" fabric article to be tested to obtain the "dry" fabric article's weight.

Step 3: Pour 2L of a siloxane at ~20C into the reservoir.

Step 4: Place fabric article from Step 2 into the siloxane-containing reservoir.

Step 5: Agitate the fabric article within the reservoir to ensure no air pockets are left inside the fabric article and it is thoroughly wetted with the siloxane.

Step 6: Remove the fabric article from the siloxane-containing reservoir.

Step 7: Unfold the fabric article, if necessary, so that there is no contact between same or opposite fabric article surfaces.

Step 8: Let the fabric article from Step 7 drip until the drop frequency does not exceed 1 drop/sec.

Step 9: Weigh the "wet" fabric article from Step 8 to obtain the "wet" fabric article's weight.

Step 10: Calculate the amount of siloxane absorbed for the fabric article using the equation below.

$$FA=(W-D)/D*100$$

where:
FA=fluid absorbed, % (i.e., the absorption capacity of the fabric article in terms of % by dry weight of the fabric article)
W=wet specimen weight, g
D=initial specimen weight, g By the term "non-immersive" it is meant that essentially all of the fluid is in intimate contact with the fabric articles. There is at most minimal amounts of "free" wash liquor. It is unlike an "immersive" process where the washing fluid is a bath in which the fabric articles are either submerged, as in a conventional vertical axis washing machine, or plunged into, as in a conventional horizontal washing machine. The term "non-immersive" is defined in greater detail according to the following Test Protocol for Non-Immersive Processes. A process in which a fabric article is contacted by a fluid is a non-immersive process when the following Test Protocol is satisfied.

Test Protocol for Non-Immersive Processes

Step 1: Determine absorption capacity of a fabric specimen using Test Protocol for Measuring Absorption Capacity of a Fabric Article, described above.

Step 2: Subject a fabric article to a fluid contacting process such that a quantity of the fluid contacts the fabric article.

Step 3: Place a dry fabric specimen from Step 1 in proximity to the fabric article of Step 2 and move/agitate/tumble the fabric article and fabric specimen such that fluid transfer from the fabric article to the fabric specimen takes place (the fabric article and fabric specimen must achieve the same saturation level).

Step 4: Weigh the fabric specimen from Step 3.

Step 5: Calculate the fluid absorbed by the fabric specimen using the following equation:

$$FA=(W-D)/D*100$$

where:
FA=fluid absorbed, %
W=wet specimen weight, g
D=initial specimen weight, g Step 6: Compare the fluid absorbed by the fabric specimen with the absorption capacity of the fabric specimen. The process is non-immersive if the fluid absorbed by the fabric specimen is less than about 0.8 of the absorption capacity of the fabric specimen.

The term "siloxane", as used herein, means silicone fluids which are non-polar and insoluble in water or lower alcohols. They are completely miscible in typical aliphatic and aromatic solvents, including the halogenated solvents, but are only partially miscible with the intermediate petroleum fractions such as naphthalenes. Linear siloxanes (see for example U.S. Pat. Nos. 5,443,747, and 5,977,040, both incorporated herein by reference in their entirety) and cyclic siloxanes are useful herein, including the cyclic siloxanes selected from the group consisting of octamethyl-cyclotetrasiloxane (tetramer), dodecamethyl-cyclohexasiloxane (hexamer), and preferably decamethyl-cyclopentasiloxane (pentamer, commonly referred to as "D5"). Most preferred are wash mediums wherein the siloxane comprises more than about 50% cyclic siloxane pentamer, more preferably more than about 75%, most preferably at least about 90% of the pentamer. Also preferred are wash mediums comprising siloxanes which are a mixture of cyclic siloxanes having at least about 90% (preferably at least about 95%) pentamer and less than about 10% (preferably less than about 5%) tetramer and/or hexamer.

For the present invention process, the specific method for contacting the wash medium containing the siloxane with the fabric article may be any method which results in complete wetting of the fabric articles in the wash load by the automatic washing machine, in contrast to spot wetting and/or hand wetting of the fabric articles. This includes contacting the fabric articles in an immersive bath of the wash medium or, preferably, using lower volumes of wash medium as is possible by low volume wetting means such as spraying to uniformly wet the fabric articles. Most preferred is contacting the fabric articles using a method that comprises at least one non-immersive step whereby the fabric article is wetted with the wash medium (preferably by uniform spraying), for example only to the extent of less than about 500%, more preferably less than about 200% (even more preferably less than about 150%) to about 20%, more preferably to about 50% by dry weight of the fabric article in the wash load.

One aspect of the present invention involves the contacting of the fabric articles with a wash medium comprising less than about 50% water, more preferably less than about 30%, less than about 20%, less than about 10%, less than about 5%, less than about 1%, and most preferably no purposively added water. However, in another aspect of the present invention some amount of purposively added water is a part of the wash medium with the siloxane, including for example either immisible with the siloxane or as an emulsion comprising siloxane, water, and an emulsifying agent. Preferably the water comprises from about 0.1% to about 50%, more preferably from about 0.1% to about 30%, from about 0.1% to about 20%, from about 0.1% to about 10%, from about 0.1% to about 5%, and from about 0.1% to about 1%.

In accordance with the present invention, the fabric articles to be treated and/or cleaned may be contacted with an impinging gas at any time during the method of the present invention.

It is desirable that the fabric articles are contacted by an impinging gas at least prior to applying the cleaning fluid. The impinging gas facilitates the removal particulate soils from the fabric articles. Particulate soils can be successfully removed using gas flow. Particulate soils include any soil that is comprised of discrete particles. Nonlimiting examples of such particulate soils include clay, dust, dried mud, sand, cat fur, skin flakes or scales, dander, dandruff, hair from people or pets, grass seeds, pollen, burrs, and/or similar animal, mineral or vegetable matter which is insoluble in water.

By utilizing the impinging gas, "demand" on chemicals in the process for removing such particulate soils is reduced.

Typically, the impinging gas is flow from a gas source at a rate of from about 10 l/s to about 70 l/s and the gas contacts the fabric articles at a velocity of from about 1 m/s to about 155 m/s. It is desirable to mechanically agitate the fabric articles while the gas impinges on the fabric articles. Further, it is desirable to remove the gas, and particulate soils in the gas from the fabric articles at a rate sufficient to prevent the removed particulate soils from re-depositing upon the fabric articles.

In one embodiment of the present invention the gas is selected from the group consisting of air, nitrogen, ozone, oxygen, argon, helium, neon, xenon, and mixtures thereof, more preferably air, nitrogen, ozone, oxygen, argon, helium, and mixtures thereof, even more preferably still air, ozone, nitrogen, and mixtures thereof.

In another embodiment of the present invention the gas used in the method can be varied over time. For example air could be used at the start of the process, a mixture of air and ozone used in the middle stages of the process and air or nitrogen could be used at the end.

The gas used may be of any suitable temperature or humidity. Heat could be supplied to the gas electrically or by passing the gas over a gas flame, such as, is done in a conventional gas dryer. However, room temperature and humidity gas are preferred.

In one embodiment of the present invention two or more gases could be mixed in a mixing chamber before being used in the process. In another aspect of this embodiment of the present invention the gases could be delivered concurrently through different entry points and mix in-situ in the walled vessel. In another aspect of this embodiment of the present invention the gases supplied could exist as mixture and would not require any mixing chamber to achieve the required mixture of gas for the process.

In one embodiment of the present invention the gas could be available from storage, such as from pressurized containers. Alternatively, the gas used in the process could be obtained from the location where the process and device occur. For example, a pump, blower, or the like, may be used to supply air from the surrounding atmosphere for the process of the invention. A combination of gas available from storage and from the atmosphere is also envisioned.

In another embodiment of the present invention the gas can be obtained from a compressor. The compressor may be any compressor suitable for providing gas or gases, provided that they supply the gas to the apparatus within the required velocity and flow rate ranges. The compressors are linked to the gas inlet(s) by an appropriate fixture, such as a hose, pipe, tap, fixture or combinations thereof, to provide the inlet(s) with the gas or gases within the required velocity and flow rate ranges. Some typical compressors, which are suitable for providing gas or gases, include rotary screw compressors or two-stage electrical compressor. Another suitable type of compressor is the so-called "acoustical compressor", such as those described in U.S. Pat. Nos. 5,020,977, 5,051,066, 5,167,124, 5,319,938, 5,515,684, 5,231,337, and 5,357,757, all of which are incorporated herein by reference. Typically, an acoustical compressor operates in the following fashion: A gas is drawn into a pulse chamber, such as air from the atmosphere, compressed, and then discharged as a high-pressure gas. The gas is compressed by the compressor sweeping a localized region of electromagnetic, for example microwaves, laser, infrared, radio etc, or ultrasonic energy through the gas in the pulse chamber at the speed of sound. This sweeping of the pulse chamber creates and maintain a high-pressure acoustic pulse in the gas. These acoustical compressors have many advantages over conventional compressors. For example, they have no moving parts besides the valves, operate without oil, and are much smaller than comparable conventional compressors.

In one embodiment of the present invention the gas is provided from a gas source at a rate of from about 10 l/s to about 70 l/s, more preferably, about 20 l/s to about 42 l/s, even more preferably about 25 l/s to about 30 l/s. The gas flow rate is measure by a flow meter place in the internal space of the vessel close to where the gas enters the vessel containing the clothes.

In one embodiment of the present invention the gas contacts the fabric articles at a velocity of from about 1 m/s to about 155 m/s, more preferably, about 50 m/s to about 105 m/s even more preferably about 75 m/s to about 105 m/s. The gas velocity is measure by a flow meter place in the internal space of the vessel close to where the gas enters the vessel containing the clothes.

The velocity at which the gas contacts the fabric articles and the flow rate of the gas are critical parameters. For example insufficient velocity, means that the particulates are not removed from the fabric articles. Too great a velocity and the fabric articles are disrupted such that the fabric articles cannot be agitated and the particulate soils cannot be removed. Similarly, insufficient flow rate of the gas means that any particulate soils removed remain and can be re-deposited on the fabric article after cleaning.

Obviously the present invention process cannot use current conventional automatic washing machines as developed for aqueous wash processes. While automatic washing machines useful for the present process may be connected to a water source, such connection for purposes of carrying out the current process is solely for the supply of the optional purposively added water. A supply of the siloxane is necessary, preferably stored in a container for use in the current process and into which the siloxane is returned (following a suitable cleaning process) after contact with the fabric articles in the automatic home laundry process.

While an apparatus having the various components as defined for the immersive commercial dry cleaning process as described in U.S. Pat. No. 6,059,845, issued May 9, 2000, and U.S. Pat. No. 6,063,135, issued May 16, 2000 (both incorporated herein by reference in their entirety), if modified for residential size and consumer maintenance, could be used to practice the present invention process, an immersive process for the present invention is not preferred. Reasons include the constraints (versus the commercial dry cleaner size and operation taught in these patents) associated with supplying, storing and cleaning larger volumes of siloxane in the home.

For these reasons lower volume processes such as those utilizing a uniform spray process which completely wets the fabric articles with the lower volumes of wash medium as described herein before are highly preferred. For example modifications of conventional low water wash appliances to deliver low levels of siloxane-containing wash medium rather than a water wash medium should be considered; such conventional water wash appliances are described for example in U.S. Pat. Nos. 4,489,574; 4,489,455; 5,191,669; 5,191,668; 5,233,718; and 5,671,494, all incorporated herein by reference in their entirety. A most preferred automatic washing machine useful for this low volume process is described in detail in the co-filed, copending patent application, P&G Case 8119P, incorporated herein by reference in its entirety. Further preferred are automatic washing machines which guarantee homogeneous coverage of the fabric articles with the siloxane-containing wash medium by intermittent spin and spray followed by random tumbling until all the wash medium has been sprayed. Also preferred are such machines which reuse the siloxane-containing wash medium via an immediate re-use/recycling action, for example by passing the wash medium over a particle removal filter after extraction from the fabric articles and then immediately spraying it back onto the fabric articles.

Further preferred automatic washing machines for practicing the present invention processes are designed to also dry the fabric articles in the same apparatus. This not only allows the consumer the convenience of not having to handle the wet fabric articles but also permits recovery of all the siloxane for reuse or cleaning.

It is also envisioned that adjuncts for cleaning and/or treating the fabric articles according to the desires of the consumer may be added to the process. The automatic washing machine therefore preferably includes receptacles for receiving and/or dispensing such adjuncts into the automatic laundry process at the desired time, either with the wash medium or separate from it. Cartridges containing such adjuncts (either through refilling or purchased with the adjunct) which releaseably attach to the machine are also optional executions. A particularly preferred adjunct is any material which functions as an antistatic agent when combined with the siloxane-containing wash medium in the present automatic home laundry process.

An additional preferred feature of the automatic washing machine is the ability to clean and reuse the siloxane for more than one automatic laundry process. A preferred means for cleaning the siloxane for multiple uses is a replaceable filter. Such filter should preferably include filter materials capable of removing and collecting at least the body soils removed from the fabric articles during the automatic home laundry process. Activated charcoal, silicas, molecular sieves, and/or hydrophobically modified papers are just some optional components of such filters. The attachment to the automatic washing machine is preferably by means such that the consumer can readily replace it at regular intervals.

What is claimed is:

1. An automatic lame laundry process, said process comprising the step of applying a wash medium comprising siloxane and from about 0.1% to about 50% purposively added water to fabric articles during automatic home laundry process in an automatic washing machine.

2. The automatic home laundry process according to claim 1 wherein the fabric articles are selected from the group consisting of machine washable fabric articles, dry clean only fabric article, and combinations thereof.

3. The automatic home laundry process according to claim 1 wherein the fabric articles are uniformly wetted with the wash medium comprising siloxane during the automatic home laundry process.

4. The automatic home laundry process according to claim 1 wherein the wash medium comprises from about 0.1% to about 10% purposively added water.

5. The automatic home laundry process according to claim 1 wherein the siloxane comprises cyclic siloxane.

6. The automatic home laundry process according to claim 5 wherein the cyclic siloxane comprises about 50% or more cyclic siloxane pentamer.

7. An automatic home laundry process, said process comprising at least one step of contacting fabric articles in an automatic washing machine in the home with a wash medium comprising siloxane wherein the step is a non-immersive step.

8. The automatic home laundry process according to claim 7 wherein the siloxane comprises cyclic siloxane.

9. The automatic home laundry process according to claim 8 wherein the cyclic siloxane comprises about 50% or more cyclic siloxane pentamer.

10. The automatic home laundry process according to claim 7 wherein the siloxane comprises about 90% or more by weight of the siloxane of cyclic siloxane pentamer.

11. The automatic home laundry process according to claim 7 wherein the fabric articles are uniformly wetted the wash medium comprising siloxane during the automatic home laundry process.

12. The automatic home laundry process according to claim 7 wherein the wash medium comprises no purposively added water.

13. The automatic home laundry process according to claim 7 wherein the wash medium comprises from about 0.1% to about 50% purposively added water.

14. The automatic home laundry process according to claim 7 wherein the wash medium comprises from about 0.1% to about 5% purposively added.

15. The automatic home laundry process according to claim 7 wherein the fabric articles are selected from the group consisting of machine washable fabric articles, dry clean only fabric articles, and combinations thereof.

* * * * *

UNITED STATES PATENT AND TRADEMARK OFFICE
CERTIFICATE OF CORRECTION

PATENT NO.    : 6,840,963 B2
DATED         : January 11, 2005
INVENTOR(S)   : John Cort Severns It is certified that error appears in the above-identified patent and that said Letters Patent is hereby corrected as shown below:

<u>Column 8,</u>
Line 2, replace "lame" with -- home --.

Signed and Sealed this

Fourth Day of October, 2005

JON W. DUDAS
*Director of the United States Patent and Trademark Office*